Frank C. Arrance
Carl Berger
INVENTORS 3,554,814
**INORGANIC SEPARATOR AND PROCESS
FOR PRODUCING SAME**
Frank C. Arrance, Costa Mesa, and Carl Berger, Santa
 Ana, Calif., assignors to McDonnell Douglas Corporation, Santa Monica, Calif., a corporation of Maryland
Filed Feb. 13, 1969, Ser. No. 798,992
Int. Cl. H01m 3/00; C09d 3/24
U.S. Cl. 136—146                                                  14 Claims

ABSTRACT OF THE DISCLOSURE

Method for increasing the transverse strength and reducing the resistivity of an inorganic separator, e.g., a separator comprising a sintered solid solution consisting essentially of magnesium silicate and iron silicate, comprising, according to one embodiment, impregnating the open pores of such sintered separator with pitch, covering the impregnated separator with graphite dust, and heating the so-treated separator at temperature ranging, for example, from about 1500 to about 2500° F. for a period of hours, and cooling the separator; and the improved inorganic separators thereby produced, impregnated with metal carbides and having a thin porous carbon coating on the surface of the separator.

Figure 1:
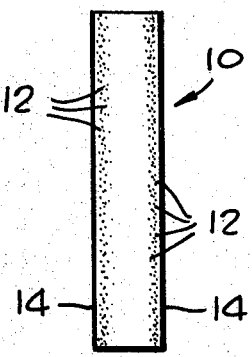

This invention relates to inorganic battery separators and is particularly concerned with improving the operating characteristics of inorganic battery separator when employed in batteries and electrochemical devices such as high energy density batteries, e.g., silver-zinc, silver-cadmium, and nickel-cadmium batteries, metal-air batteries such as zinc-air batteries, non-aqueous cells, and thermal batteries, and to the improved inorganic separators produced according to the invention process. The invention has as a particular object the production of inorganic battery separators having substantially increased transverse strength and substantially reduced resistivity.

Electrochemical devices, particularly batteries, are an important source of energy storage for power generation. In addition to the common lead-acid storage battery, an important type of battery is the high energy density alkaline electrolyte battery using such electrode combinations as silver-zinc, silver-cadmium and nickel-cadmium. Other types of electrochemical devices or batteries have also attained significant importance, such as metal-air, e.g., zinc-air, and thermal batteries. In such batteries, it is conventional to employ a separator in the form of a porous member between the electrodes.

In such batteries, e.g., the high energy density batteries noted above, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved inorganic separators have been developed, preferably in the form of sintered ceramic separators, which when assembled in a battery, e.g., a silver-zinc high energy density battery, have resulted in substantially improved battery life at both ambient temperature and elevated temperature, that is, a battery capable of operating efficiently over a large number of discharge-charge cycles, and said batteries are also operable at high temperature, e.g. of the order of 100° C. and above.

Although such improved inorganic separators have good strength and resistivity, as well as resistance to electrolytes such as potassium hydroxide, due to the rigorous conditions under which many of these batteries are required to operate, and the continuing requirements for improved electrical efficiency, further improvement in the transverse strength of such inorganic separators and in their resistivity, is required for many battery applications.

It has been discovered according to the invention that the physical strength and electrical resistivity of inorganic separators such as that comprising a sintered solid solution of magnesium silicate and iron silicate, can be substantially improved by a method which comprises impregnating the open pores of the porous inorganic separator with pitch or tar, heating the so-impregnated separator at temperature ranging from about 1,000 to about 3,000° F. in an oxygen-free atmosphere and cooling the separator. According to one embodiment, the impregnated separator is covered with graphite dust prior to heating same, thereby protecting the impregnated separator from contact with an oxygen atmosphere during such heating.

The result of the above process or treatment is to substantially increase the transverse strength of the treated inorganic separators, e.g., as much as 50% or more, and to reduce the resistivity of such separators, e.g., in an amount up to about 50% or more, as compared to the pre-treated separators per se. As will be noted in detail hereinafter, the separators resulting from the invention process, are strengthened by formation of carbides or carbide particles, as a result of the reaction of the carbon contained in the pitch or tar, with metal constituents of the inorganic separator, e.g., iron, and also have a thin porous coating of carbon formed on the surface of the separator, covering the open pores of the separator. The separator produced according to the invention process also has increased resistance to alkali, such as potassium hydroxide.

The invention process is described below chiefly in connection with the treatment of a sintered porous separator comprising a solid solution consisting essentially of magnesium silicate and iron silicate, and is a preferred form of separator according to the invention. However, as will be noted hereinafter, the invention process is applicable to a wide variety of inorganic separators, a number of which will be described hereinafter.

The sintered porous separator comprising a solid solution of magnesium silicate and iron silicate is first treated to impregnate the surface-connected open pores of the sintered separator with pitch or tar. For purposes of the invention, a wide variety of these materials can be employed. Thus, for example these include pitches in the form of residues from the distillation or oxidation of mineral oils such as blown asphalt, battery sealing compound (a pitch similar to asphalt), residues from the distillation of tars including coal tar pitch, coke oven tar pitch, blast furnace tar pitch, water gas tar pitch, wood tar pitch, and pine tar pitch; roofing pitch, brewer's pitch, and insulating pitch. Representative of tars which can be employed are coke oven tars, asphalt tar, dehydrated coke oven tar and the like. For purposes of the invention, any source of free carbon, e.g., derived from coal or mineral oil, can be employed, of which tars and pitches, specific examples of which are noted above, are particularly useful.

The pitch or tar is applied to the inorganic separator, e.g., solid solution of magnesium, silicate and iron silicate, by dissolving the carboneceous material in a suitable solvent and contacting the separator with the solvent solution of the pitch or tar. Suitable solvents for this puropse can include gasoline, kerosene, trichloroethylene, alcohol, chloroform or other chlorinated solvents, e.g., carbon tetrachloride, depending upon the particular pitch or tar employed. Thus for example, gasoline is a suitable solvent for asphalt pitch, trichloroethylene is suitable for roofing pitch or asphalt, including battery sealing compound, and for natural pitches such as pine tar pitch, solvents such as alcohol and chlorinated solvents such as carbon tetrachloride are suitable.

It is preferable to form a saturated solution of the pitch or tar in the solvent, but such solution should be of a watery nature, that is free flowing, and not viscous in order to permit efficient impregnation of the open pores of the separator. Usually, about a 10 to about 40% concentration of the pitch or tar, by weight of the solution, is employed. As previously noted, the solution should not be viscous so as to prevent impregnation of the pores of the separator nor should it be too dilute so that insufficient carbonaceous material is impregnated into the separator pores.

A convenient way of applying the solution of the pitch or tar to the separator is to immerse the inorganic separator in the solvent solution of the pitch or tar, so that the separator is fully covered with solution, and to apply a vacuum to the separator to impregnate the solvent solution into the open pores of the separator, e.g., as by applying a vacuum to the solution in which the separator is immersed. An alternative mode of procedure is to place the separator and solution in a plastic bag, and then subject the bag to pressure of the order of 10,000 to 25,000 p.s.i. in a hydrostatic press, and maintain such pressure for a period of about 15 to about 30 minutes, to carry out the impregnation of the open separator pores. It will be understood however, that any suitable method can be employed for impregnating the open pores of the inorganic separator with the solvent solution of the pitch or tar.

Following impregnation of the inorganic separator, the solvent for the pitch or tar is removed by air drying, e.g., for a period of about 12 to about 36 hours, or such solvent removal can be accelerated by light or moderate heating of the impregnated separator. Any period of heating for removal of solvent should not be at such a temperature nor for such a prolonged period of time as to soften the impregnated tar or pitch.

The impregnated separator is then subjected to heating, as by being placed in a furnace, at a temperature and for a period of time set forth in further detail below, and in an oxygen-free atmosphere. The maintenance of an oxygen-free atmosphere is particularly important to prevent oxidation of the carbonaceous material, that is the tar or pitch, at the high temperatures of treatment of the impregnated separator. According to one preferred mode of procedure, to insure an oxygen-free atmosphere during heating of the impregnated separator prior to such heat treatment, the impregnated separator is covered with graphite dust so that no surfaces of the separator are exposed to the atmosphere. The impregnated separator so protected by the graphite dust is then heated as described below, the separator thus being protected by the graphite shield from any oxygen in the surrounding atmosphere during heating.

Such heat treatment of the impregnated separator is carried out at temperature ranging from about 1,000 to about 3,000° F., usually in the range from about 1,500 to about 2,500° F. Time of heat treatment can range from about 1 to about 15 hours, but usually ranges from about 1 to about 5 hours. At the higher ranges of temperature, usually shorter heating periods are employed, and for lower heating temperatures, generally longer periods of heat treatment are utilized. For example when employing the above noted porous sintered separator formed of a solid solution of magnesium silicate and iron silicate, heat treatment temperature of the order of 1,500 to about 2,200° F. for a period of about 1 to about 2 hours has been found to be satisfactory.

As an alternative to covering the impregnated separator with graphite to prevent contact with any ambient oxygen, the heating of the separator can be carried out in a reducing atmosphere by employing for example an atmosphere of hydrogen, carbon monoxide, ammonia or forming gas (a mixture of hydrocarbons and hydrogen). In place of a reducing atmosphere, an inert atmosphere can be employed during heating of the impregnated separator, for example an argon, nitrogen or other inert gas atmosphere, thus preventing contact of any oxygen with the impregnated separator during heating thereof.

Following the above noted heating of the impregnated separator, the separator is cooled in the furnace to protect it from any access to oxygen during such cooling period. After cooling down to ambient temperature, which takes generally from about 4 to about 20 hours, the treated separator is withdrawn from the furnace. Generally the thus treated separator has some surface carbon which is loosely connected to the separator surface. This is generally removed by a suitable cleaning operation, e.g., by brushing the loose carbon from the surface. However, such surface carbon cleaning is not an essential step in the invention process and can be omitted.

The separator thus produced according to the invention process has substantially increased transverse strength and substantially reduced resistivity, compared to the inorganic separator prior to treatment. These significant changes in the physical properties of the separator are considered to be the result of the formation of metal carbides or particles of metal carbides, within the separator structure, produced by the reaction of the impregnated carbonaceous material such as the pitch or tar, with metallic constituents of the inorganic separator during the heat treatment of the impregnated separator in he oxygen-free atmosphere. Thus, for example, in the case of a separator comprising a solid solution of magnesium silicate and iron silicate, iron carbide particles are formed within the separator structure, and where olivine, the naturally occurring mineral, is used in producing such solid solution magnesium silicate-iron silicate separators, since such natural minerals also contain impurities such as nickel compounds, nickel carbide particles are also formed. Also, with respect to this type of separator, reduction of the ferric iron to ferrous iron in the separator structure is also believed to contribute to increased strength of the separator.

In the case of other inorganic separators such as for example alumina, zirconia (which also contains a minor amount of calcium) and chromite separators, described more fully below, metal carbides such as aluminum carbide, zirconium carbide, calcium carbide, and iron and chromium carbides result.

The separators produced according to the invention process also have a thin porous carbon coating on the surface thereof, derived from the carbonaceous material impregnated into the separator and the subsequent heating thereof, such coating covering the open surface pores of the separator. However, such carbon coating is sufficiently porous to permit introduction and retention of electrolyte in the separator. Such carbon coating confers improved resistance of the inorganic separator to alkali when the separator is employed in a battery such as high energy density battery employing alkali electrolytes.

As previously noted, a wide variety of inorganic separators can be treated according to the invention to produce improved separators having increased strength and reduced resistivity. A preferred separator for treatment according to the invention is in the form of a sintered porous member which is preferably comprised of about 10 to about 90 mol percent magnesium silicate, and about 90 to about 10 mol percent iron silicate; most preferably the separator is comprised of from about 40 to about 60 mol percent magnesium silicate and about 60 to about 40 mol percent iron silicate. The iron silicate can be in the form of ferrous silicate, ferric silicate, or mixtures thereof.

Such separator can be produced from a starting material in the form of a mixture of, for example, suitable proportions of ferrous oxide, magnesium oxide and silicon dioxide. Such starting material or mixture is compacted, e.g., at pressure ranging from about 2,000 to about 10,000 p.s.i., into the form or shape of the separator desired, e.g., in the form of a disc, and the resulting compacted members are then sintered at a temperature ranging from about 800° C. to about 1,400° C. for a period sufficient to convert the components of the starting mixture into the solid solution of iron silicate and magnesium silicate.

To more readily control shrinkage where only a single sintering operation is carried out, the above-noted solid solution of magnesium silicate and iron silicate can be ground and mixed with the unsintered material, and the resulting mixture formed into the desired separator shape, e.g., into the form of discs, by compaction, e.g., at pressures of about 2,000 to about 10,000 p.s.i., and the resulting compacted members or discs are then subjected to further sintering, preferably at temperatures ranging from about 1,000° C., to about 1,500 C.

Alternatively, the preferred magnesium silicate-iron silicate solid solution separator can be produced using as starting material olivine, a naturally occurring mineral which is a magnesium-iron silicate, to form the solid solution of iron silicate-magnesium silicate. The material is compacted and sintered as noted above to form a solid solution as noted above.

There can also be employed in the invention process sintered porous separators consisting essentially of a solid solution of magnesium silicate and zinc silicate, preferably containing not more than about 40 mol percent magnesium silicate, by procedures similar to that described above for producing separators formed of a solid solution of magnesium silicate and iron silicate.

The production of such magnesium silicate-iron silicate and magnesium silicate-zinc silicate solid solution separators, which generally have a transverse strength of the order of about 8,000 to about 10,000 p.s.i., is described in detail in the co-pending application Ser. No. 539,554 of C. Berger et al., filed Apr. 1, 1966, now Pat. No. 3,446,668 and such disclosure is incorporated herein by reference.

Another form of inorganic separator which can be employed in the invention process is a separator consisting essentially of zirconia. An exemplary form of such a separator is one composed of calcia stabilized zirconia, produced by heating a mixture of 96% zirconia ($ZrO_2$), and 4% calcium oxide to temperature of the order of about 3,000° F., to form a solid solution of calcium oxide and zirconium oxide, forming a mixture containing 97% of the resulting calcia stabilized zirconia and 3% bentonite, presintering such material at 1,000 to about 1,200° C., ball milling such sintered material to small particles size, compacting such material into separator membranes at pressures ranging, e.g., from about 2,000 to about 10,000 p.s.i., and sintering again to temperature of about 1,000 to about 1,200° C., to produce zirconia separator membranes.

Another form of separator which can be employed is a porous separator consisting essentially of alumina, for example formed by compacting alumina (aluminum oxides), e.g., at pressures of about 5,000 to 10,000 p.s.i., into membranes, and sintering such membranes at temperatures ranging from about 300° C., to about 1,800° C.

Still another form of inorganic separator which can be improved by procedure according to the invention, are porous separators consisting essentially of a solid solution of a major portion of magnesium oxide and a minor proportion of an oxide such as zirconium dioxide, chromic oxide, aluminum oxide, titanium oxide, and certain other oxides, as described and claimed in co-pending application Ser. No. 727,394, filed may 8, 1968 of F. C. Arrance et al.

Also, separators derived from natural chromite, and containing oxides of iron, magnesium, aluminum and chromium, and formed into a solid solution, as described and claimed in co-pending application Ser. No. 727,678 of F. C. Arrance, filed May 8, 1968 can be employed.

As a further example, separators formed from chrome-iron and known as spinelloids and formed of $FeO \cdot CrO_3$ and comprising 35 to 50% chromic oxide, together with some silica as magnesium silicates, can also be employed.

The above noted sintered inorganic or ceramic separators generally have a predetermined thickness of the order of about 0.005 to about 0.030 inch, and have a porosity ranging from about 10% to about 40%.

The following are examples of practice of the invention:

EXAMPLE 1

An inorganic separator is formed from olivine, a magnesium, iron silicate composed of 41% $SiO_2$, 49.3% MgO, and 6% FeO, by weight. The material is compacted at about 5,000 p.s.i., and the compacted separators in the form of discs are sintered by heating at 1,200° C. The resulting sintered separator is in the form of a solid solution of magnesium silicate and iron silicate, containing about 89 mol percent magnesium silicate and about 11 mol percent iron silicate. The separator has a thickness of about 0.030 inch, a transverse strength of about 10,000 p.s.i., and a resistivity of about 30 ohm-cm., and a porosity of about 15%.

Such solid solution sintered olivine separator is immersed in about a 40% by weight solution of blown asphalt in gasoline as solvent, and the container for the solution in which the separator is immersed placed under vacuum for a period of about 30 minutes to impregnate the surface connected open pores of the sintered separator with the asphalt pitch.

The resulting impregnated separator is then dried by contact with the atmosphere for a period of about 15 hours and then placed in an oven at about 125° F. and further dried for an additional 1 to 2 hours, without softening the impregnated asphalt or pitch.

The resulting impregnated separator is then covered with graphite dust, in the form of acetylene black, by placing about a ¼ to ½ inch layer of the graphite dust in a refractory box or sagger, then placing the separator in the box on top such layer of graphite, and then covering the separator with an overlayer of about ½ to 2 inches of the graphite dust, thus completely surrounding the separator with the graphite dust to protect it from any oxygen-containing atmosphere.

In place of graphite dust, other types of graphite such as that known as coke oven breeze, and the like, can be employed.

The refractory box or sagger, containing the impregnated separator protected by the graphite dust cover, is placed in a furnace and heated at a temperature of about 2,000° F. for about 2 hours.

The furnace is then permitted to cool with the box containing the impregnated separator, down to about ambient temperature, and the sagger box containing the separator is removed, and any adherent particles of graphite or carbon remaining on the surface of the separator is cleaned from the surface by brushing.

The result of this treatment is to increase the transverse strength of the initial sintered olivine separator by about 50% and to reduce the resistivity of the separator by about 50%. Thus, the initial resistivity of about 30 ohm-cm. for the initial untreated olivine separator, is reduced to only 15.9 ohm-cm. in the final impregnated separator, resulting from the invention procedure. The transverse strength of the treated separator is about 15,000 p.s.i. as compared to the about 10,000 p.s.i. for the initial untreated olivine separator.

By impregnating the surface connected open pores of the sintered olivine separator with the carbonaceous material and heating to the above noted elevated temperature, an improved olivine separator is produced according to the invention, as illustrated at 10 in FIG. 1 of the drawing, in which iron carbide particles are formed particularly in the surface connected pores as a result of the reaction of the carbon in the pitch or asphalt with the iron content of the olivine separator, as indicated at 12 in FIG. 1. In addition, additional strength is imparted to the olivine separator by the reduction of the ferric iron to ferrous iron in the separator structure. Also, a thin porous coating of carbon is formed on the surface of the separator, as indicated at 14 in FIG. 1. As previously noted, such porous carbon coating renders the impregnated olivine separator of the invention more resistant to alkali.

Figure 2:
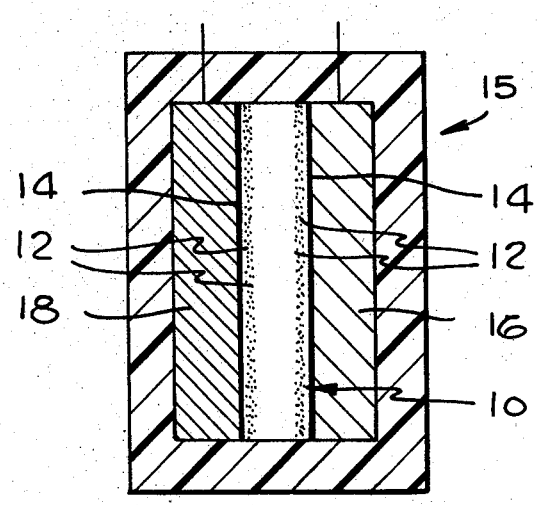

When the olivine separator resulting from the procedure noted above, and illustrated in FIG. 1 of the drawing, is incorporated in a battery 15 and disposed between a zinc electrode 16 and a silver oxide electrode 18, as illustrated schematically in FIG. 2 of the drawing, with potassium hydroxide electrolyte incorporated in the separator, the resulting battery operates with high efficiency over about 500 to about 2,500 one hour charge—one half hour discharge cycles at both ambient and elevated temperatures of the order of 100° C. and the separator retains its physical integrity despite any rough handling or shocks to which the battery is subjected.

EXAMPLE 2

The procedure of Example 1 is repeated except that the initial porous magnesium silicate-iron silicate solid solution separator is synthetically produced from a mixture of 40% flint (silica), 10% iron oxide calculated as FeO, and 50% magnesium carbonate, calculated as MgO, by weight. A portion of the mixture is first granulated and then sintered by heating the mixture at about 1,260° C., for a period of 2 hours.

The resulting granulated sintered material is then mixed with the initial uncalcined mixture of flint, iron oxide, and magnesium carbonate noted above, in a proportion of 75 parts of the granulated sintered material and 25 parts of the uncalcined mixture. The resulting mixture of sintered material and uncalcined material is then pressed in suitable dies at pressures of about 5,000 p.s.i. The pressed separators are thus formed into discs and such discs are sintered by heating at 1,425° C., for 2 hours. The resulting sintered magnesium silicate-iron silicate separator is in the form of a solid solution of these materials. The separator has a transverse strength of about 8,000 p.s.i., a porosity of about 15% and a thickness of about .030 inch.

The resulting impregnated separator produced by subjecting the above untreated separator to the procedure of the invention as described in Example 1, has improved transverse strength and reduced resistivity comparable to that of the impregnated separator of Example 1.

EXAMPLE 3

The procedure of Example 1 is followed employing the sintered olivine separator employed in Example 1, except for the following changes. A 30% solution of roofing pitch dissolved in trichloroethylene is employed for impregnating the separator in place of the blown asphalt-gasoline solution employed in Example 1. Also, coke oven breeze is used to cover the impregnated separator in place of the acetylene black graphite employed in Example 1. In the heating of the impregnated separator covered with the graphite, temperature of the furnace is about 1,600° F. and the time of heating extended to about 4 hours.

The resulting treatment produces an improved olivine separator having increased transverse strength and reduced resistivity of the order noted above in Example 1.

EXAMPLE 4

The procedure of Example 1 is repeated except employing in place of the solid solution olivine separator of Example 1, a calcia stabilized porous zirconia separator formed from about 96% zirconium oxide and about 4% calcium oxide, produced as described above.

Here however, the temperature of heat treatment in the furnace is about 1200° F. and the period of treatment is for about 6 hours.

The resulting impregnated separator has a transverse strength of about 11,000 p.s.i. as compared to about 8,000 for the initial untreated separator, corresponding to an increase of about ⅓ in transverse strength, and a resistivity of about 12 ohm-cm. as compared to about 18 ohm-cm. for the initial untreated separator, corresponding to ⅓ reduction in resistivity.

EXAMPLE 5

The procedure of Example 1 is followed except employing as the initial separator a porous alumina membrane produced as described above.

The resulting impregnated separator has substantially increased transverse strength as compared to the initial untreated alumina separator, and has substantially reduced resistivity as compared to the initial untreated separator.

EXAMPLE 6

The procedure of Example 1 is repeated except that the impregnated olivine separator, after removal of the solvent, is placed in a furnace in which there is present a reducing carbon monoxide atmosphere.

The resulting impregnated olivine separator has increased transverse strength and reduced resistivity comparable to the treated impregnated olivine separator in Example 1.

EXAMPLE 7

The procedure of Example 6 is repeated except that in place of a reducing atmosphere in the furnace during heat treatment of the impregnated olivine separator, there is employed an inert nitrogen atmosphere.

The resulting impregnated olivine separator has properties comparable to that of the separator of Example 6.

From the foregoing, it is seen that the invention provides a relatively simple procedure for substantially increasing the transverse strength and substantially reducing the resistivity of inorganic separators, particularly those consisting essentially of a solid solution of magnesium silicate and iron silicate, especially of importance when separators of this type are applied in electrochemical cells where low resistivity and high strength are necessary for high cell efficiencies.

While we have described particular embodiments of our invention for purposes of illustration, within the spirit of the invention, it will be understood that various changes and modifications of the invention can be made by those skilled in the art, and the invention is not to be taken as limited except by the scope of the appended claims.

We claim:

1. A process which comprises impregnating the open pores of a porous inorganic separator with pitch or tar, heating the so-impregnated separator at temperature ranging from about 1,000° F. to about 3,000 F. in an oxygen-free atmosphere and cooling said separator.

2. A process as defined in claim 1, said heating temperature ranging from about 1,500 to about 2,500° F.

3. A process as defined in claim 1, including covering said impregnated separator with graphite prior to heating same, thereby protecting said impregnated separator from contact with an oxygen atmosphere during said heating.

4. A process as defined in claim 1, wherein said porous inorganic separator is selected from the group consisting of (a) a sintered solid solution of magnesium silicate and iron silicate; and (b) sintered zirconia.

5. A process as defined in claim 3, wherein said porous inorganic separator is selected from the group consisting of (a) a sintered solid solution of magnesium silicate and iron silicate; and (b) sintered zirconia.

6. A process for increasing the transverse strength and reducing the resistivity of an inorganic separator, as defined in claim 1, wherein said porous inorganic separator is selected from the group consisting of (a) a sintered solid solution of magnesium silicate and iron silicate; and (b) sintered zirconia, including covering said impregnated separator with graphite dust prior to heating same, thereby protecing said impregnated separator from contact with an oxygen atmosphere during said heating, and forming metal carbide within the impregnated and heated separator and a thin carbon coating on said separator.

7. A process as defined in claim 1, wherein said separator is impregnated with said pitch or tar, by applying to said separator a solvent solution of said pitch or tar, and removing said solvent.

8. A process as defined in claim 7, said heating of said inorganic separator being carried out for a period of about 1 to about 15 hours.

9. A process as defined in claim 6, wherein said separator is impregnated with said pitch or tar, by applying to said separator a solvent solution of said pitch or tar, and removing said solvent, said heating of said inorganic separator being carried out for a period of about 1 to about 15 hours.

10. A process as defined in claim 1, said heating of said impregnated separator being carried out in a reducing atmosphere.

11. A process as defined in claim 1, said heating of said impregnated separator being carried out in an inert atmosphere.

12. In a battery, a strong porous inorganic separator impregnated with metal carbide and having a thin porous carbon coating on the surface of said separator, said separator having substantially increased strength and substantially reduced electrical resistivity in comparison to the initial non-impregnated inorganic separator.

13. In the battery of claim 12, wherein said separator is selected from the group consisting essentially of (a) a sintered solid solution of magnesium silicate and iron silicate, and (b) sintered zirconia.

14. In the battery of claim 12, wherein said separator is selected from the group consisting essentially of (a) a sintered solid solution of magnesium silicate and iron silicate, (b) sintered zirconia, (c) a sintered solid solution of magnesium silicate and zinc silicate, (d) sintered alumina, (e) a solid solution of a major portion of magnesium oxide and a minor proportion of an oxide of the group consisting of zirconium dioxide, chromic oxide, aluminum oxide and titanium oxide, (f) those derived from natural chromite, and containing oxides of iron, magnesium, aluminum and chromium, and formed into a solid solution, and (g) spinelloids formed of $FeO \cdot CrO_3$ and comprising 35 to 50% chromic oxide and magnesium silicates.

References Cited

UNITED STATES PATENTS

| | | | |
|---|---|---|---|
| 2,699,459 | 1/1955 | Blake et al. | 136—146X |
| 3,021,379 | 2/1962 | Jackel | 136—145 |
| 3,325,300 | 6/1967 | Wise et al. | 106—57 |
| 3,446,668 | 5/1969 | Arrance et al. | 136—6 |
| 3,489,610 | 1/1970 | Berger et al. | 136—6 |

ALLEN B. CURTIS, Primary Examiner

A. SKAPARS, Assistant Examiner

U.S. Cl. X.R.

106—43, 57, 284; 117—168; 136—148